(12) United States Patent
Van Seumeren

(10) Patent No.: US 9,845,228 B2
(45) Date of Patent: Dec. 19, 2017

(54) LIFT TRUCK AND LIFTING MEMBER

(71) Applicant: RAVAS EUROPE B.V., Zaltbommel (NL)

(72) Inventor: Henri Peter Maria Van Seumeren, Rossum (NL)

(73) Assignee: RAVAS EUROPE B.V., Zaltbommel (NL)

( * ) Notice: Subject to any disclaimer, the term of this patent is extended or adjusted under 35 U.S.C. 154(b) by 34 days.

(21) Appl. No.: 14/765,406

(22) PCT Filed: Feb. 6, 2014

(86) PCT No.: PCT/NL2014/050072
§ 371 (c)(1),
(2) Date: Aug. 3, 2015

(87) PCT Pub. No.: WO2014/123416
PCT Pub. Date: Aug. 14, 2014

(65) Prior Publication Data
US 2015/0368081 A1    Dec. 24, 2015

(30) Foreign Application Priority Data

Feb. 7, 2013  (NL) ..................................... 2010270

(51) Int. Cl.
*G01G 19/08* (2006.01)
*G01G 21/23* (2006.01)
(Continued)

(52) U.S. Cl.
CPC .............. *B66F 17/003* (2013.01); *B66F 9/12* (2013.01); *G01G 19/083* (2013.01); *G01G 21/23* (2013.01); *G01G 23/002* (2013.01)

(58) Field of Classification Search
CPC .... G01G 19/083; G01G 21/23; G01G 23/002; G01G 21/188; B66F 9/12; B66F 17/003
See application file for complete search history.

(56) References Cited

U.S. PATENT DOCUMENTS

| 4,381,826 A | 5/1983 | Kupper |
| 4,638,876 A * | 1/1987 | Balduin ............... G01G 19/083 |
| | | 177/139 |

(Continued)

FOREIGN PATENT DOCUMENTS

| CA | 2324481 | 5/2002 |
| CN | 102556901 | 7/2012 |

(Continued)

OTHER PUBLICATIONS

International Preliminary Report on patentability corresponding to International Application No. PCT/NL2014/050072 dated Aug. 11, 2015.

(Continued)

*Primary Examiner* — Randy Gibson
(74) *Attorney, Agent, or Firm* — Jenkins, Wilson, Taylor & Hunt

(57) ABSTRACT

A Lift truck with a lifting device comprises at least one lifting member (1) provided with lifting means for adjusting the lifting member in height direction. The lifting member (1) comprises a shell part (50) lying over a base part (2) and having a surface on which cargo can be received. The shell part supports from a pressure point on the base part (2) via an electronic force sensor (10). The force sensor (10) is able and configured to determine vertical load on the shell part (50) and to generate an electronic signal as measure thereof, and comprises for this purpose pressure and/or strain-sensitive sensor means. In a longitudinal direction of the lifting member directed transversely of the vertical load there is provided between the sensor means and the pressure point a mechanical deformation zone (31,32,33) which is able and configured to deform in at least substantially wholly elastic manner, under the influence of a force effect exerted thereon (Continued)

in the longitudinal direction, from a rest state to a state deformed in the longitudinal direction.

11 Claims, 5 Drawing Sheets

(51) Int. Cl.
    *B66F 9/12*     (2006.01)
    *B66F 17/00*     (2006.01)
    *G01G 23/00*     (2006.01)

(56) References Cited

U.S. PATENT DOCUMENTS

| | | | | |
|---|---|---|---|---|
| 4,899,840 A * | 2/1990 | Boubille | ............... | G01G 19/083 |
| | | | | 177/139 |
| 5,190,116 A * | 3/1993 | Reichow | ............... | G01G 19/083 |
| | | | | 177/211 |
| 5,205,369 A | 4/1993 | Neeleman | | |
| 5,224,815 A | 7/1993 | Abels et al. | | |
| 5,922,998 A * | 7/1999 | Zefira | ................. | G01G 19/083 |
| | | | | 177/136 |
| 7,220,924 B2 * | 5/2007 | Burkhard | ............... | G01L 1/2243 |
| | | | | 177/212 |
| 7,669,486 B2 * | 3/2010 | Simons | ................ | G01G 19/083 |
| | | | | 73/862.636 |
| 9,400,207 B2 * | 7/2016 | Johnson | ................. | G01G 21/08 |
| 2008/0178690 A1 * | 7/2008 | Simons | ................ | G01G 19/083 |
| | | | | 73/862.541 |
| 2014/0224588 A1 * | 8/2014 | Van Seumeren | ..... | B66F 17/003 |
| | | | | 187/237 |

FOREIGN PATENT DOCUMENTS

| | | |
|---|---|---|
| DE | 3408071 | 9/1985 |
| EP | 0050708 | 5/1982 |
| EP | 0483493 | 5/1992 |
| EP | 1275943 | 1/2003 |
| FR | 2727394 | 5/1996 |
| FR | 2790463 | 9/2000 |
| NL | 2007060 | 1/2013 |
| WO | WO 2013/006038 | 1/2013 |
| WO | WO 2014/123416 | 8/2014 |

OTHER PUBLICATIONS

International Search Report corresponding to International Application No. PCT/NL2014/050072 dated Apr. 24, 2014.

* cited by examiner

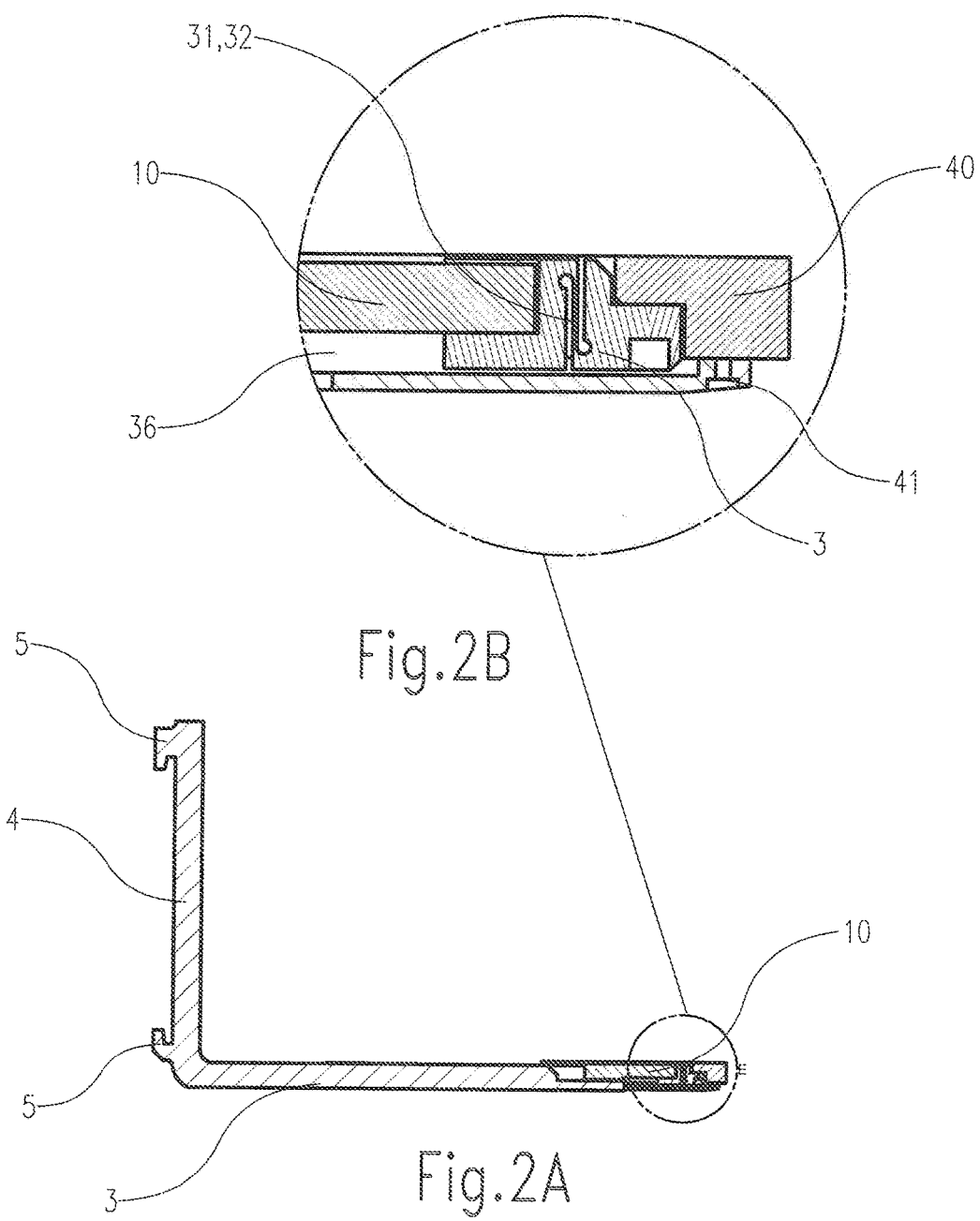

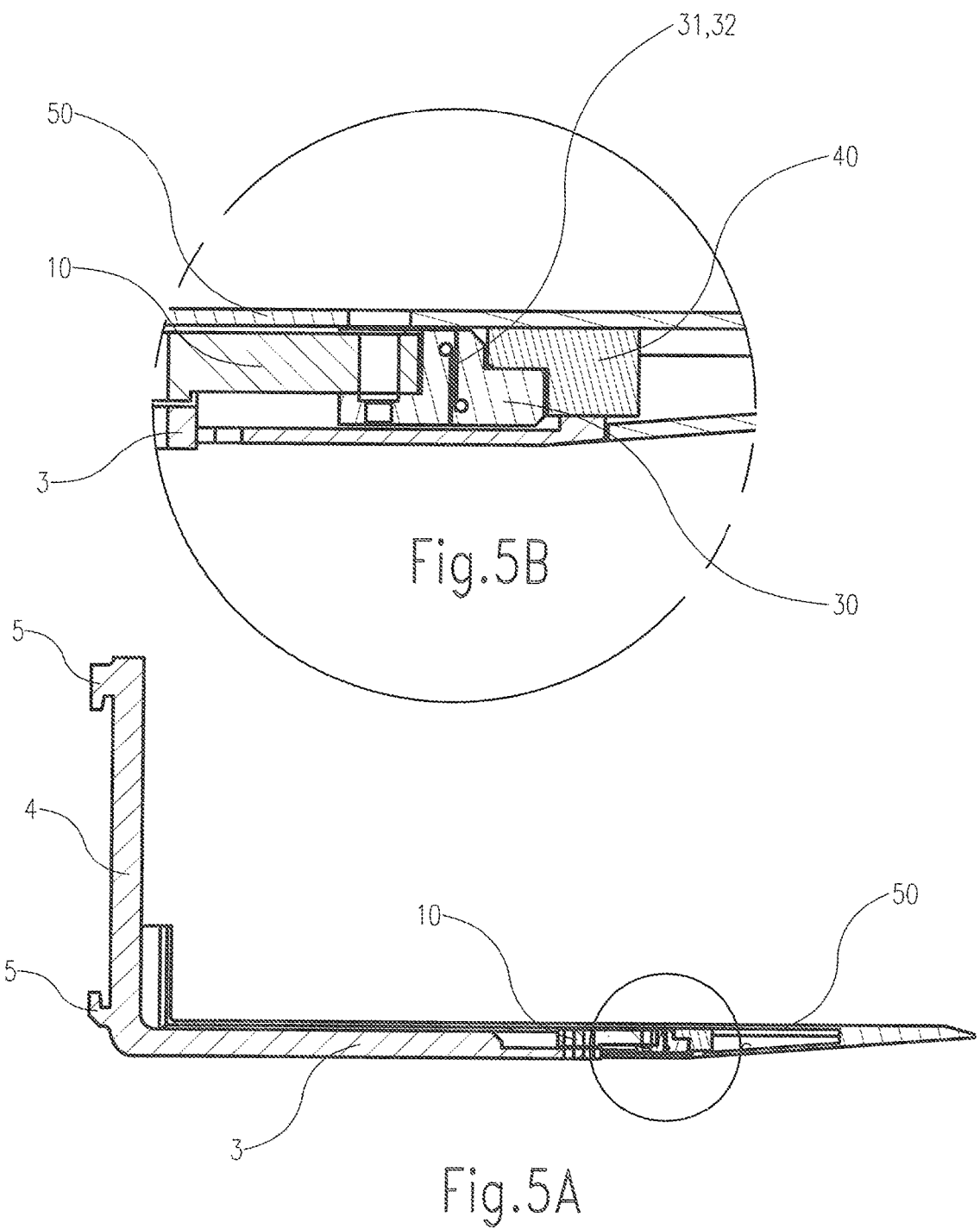

LIFT TRUCK AND LIFTING MEMBER

The present invention relates to a lift truck with a lifting device comprising at least one lifting member provided with lifting means for adjusting the lifting member in height direction, wherein the lifting member comprises a shell part lying over a base part and having a surface for receiving a cargo thereon and wherein the shell part supports from a pressure point on the base part via an electronic force sensor, this force sensor being able and configured to determine a vertical load on the shell part and to generate an electronic signal as measure thereof, and comprising for this purpose pressure and/or strain-sensitive sensor means. The present invention also relates to a lifting member, in particular a lift fork or tine, for application in a lift truck.

Known lift trucks with lifting device of the type stated in the preamble, such as (hand) pallet trucks and fork-lift trucks, are usually applied for displacing goods which are presented and processed in large quantities in distribution centres, storage warehouses and other locations. A lifting member, for instance a set of pallet forks of a pallet truck or a fork of a fork-lift truck, of the lift truck is driven here under a cargo, after which the lifting device with the lifting means can be set into operation to raise the cargo to greater or lesser extent from the ground surface. As soon as the cargo is clear of the ground, the whole can be moved to displace the cargo to another location.

It is generally useful here to know the weight of a cargo lifted by the lift truck. Lift trucks are known for this purpose which comprise a lifting member in which weighing means are provided for the purpose of measuring a weight of a cargo lifted by the lift truck. A known weighing lift truck for instance comprises a set of lift forks as lifting member, these lift forks comprising a base part over which a shell part is arranged with an at least substantially flat surface for receiving a cargo thereon. A set of electronic force sensors, usually referred to as load cells, is accommodated between the base part and the shell part. The load cells comprise a pressure or strain-sensitive sensor, for instance in the form of a so-called secondary transducer such as a strain gauge which is able and configured to determine a mechanical deformation in the load cell and to generate an electronic signal as a measure thereof. When a cargo is lifted with the lift forks the shell part is loaded vertically under a pressure load of the cargo. A force resulting from this pressure load is transmitted directly to the load cells via the shell part from the pressure point, for instance on or close to a mechanical fixing means which fixes the shell part and the force sensor, and results in a mechanical deformation of the load cells. The extent of this deformation is determined by the sensor and transmitted as electronic signal to a processing device intended for the purpose. The force exerted on the lift fork can be calculated from the electronic signal. From the signals from a plurality of force sensors together, for instance four force sensors placed at the corners of a rectangle, the overall weight of the cargo on the lift forks can finally be derived by the processing device.

The known lifting device is thus able to lift a cargo and give an indication here of a weight of the cargo concerned. An accurate measurement result will only be obtained with the force sensors in case of a load in the direction to which the force sensor is tuned, such as in the case of the known lifting device in a purely vertical direction. In the case the cargo is not optimally placed on the lifting device, loads other than a purely vertical load on the shell part may however result in a reduced accuracy of a load determined by the sensor means. A load moment of a cargo on the carrying body will result in a mechanical play of forces in the carrying body whereby determined parts in the carrying body will stretch or, on the contrary, be compressed to a degree which depends on, among other factors, a combination of the weight of the cargo and the placing of the cargo on the lifting member. A force exerted on the force sensors as a result of a cargo thus comprises in practice several components such as moment and torque forces which are the result of an eccentric loading of the lifting member in which the force sensor is incorporated. The known lifting device therefore has the drawback that a measurement result is not wholly accurate when the cargo is not optimally placed on the lifting member.

The present invention thus has for its object to provide a lifting device which obviates the stated drawback, and which particularly in some conditions gives a more accurate measurement result from a weight measurement.

In order to achieve the stated objective a lifting device of the type stated in the preamble has the feature that in a longitudinal direction of the lifting member directed transversely of the vertical load there is provided between the sensor means and the pressure point a mechanical deformation zone which is able and configured to deform in at least substantially wholly elastic manner, under the influence of a force effect exerted thereon in the longitudinal direction, from a rest state to a longitudinally deformed, for instance compressed or rotated, state. Because a deformation zone is provided between the sensor means and the pressure point, forces exerted on the shell part are transmitted from the pressure point via the deformation zone to the force sensor. The deformation zone provides compensation here for possible forces other than a purely vertical load on the shell part. If the shell part bends as a result of a cargo placed thereon, potential tensile and shear forces on the force sensor will be largely prevented or even wholly avoided due to a deformation of the deformation zone in longitudinal direction. A mainly or even only vertical load will hereby be exerted on a measuring part of the force sensor, a part in which the sensor means are incorporated.

The deformation zone can be realized in different ways but deforms elastically when a force effect is exerted thereon in the longitudinal direction, so that it is restored to the rest state when the force effect exerted thereon ceases, for instance when the cargo is removed from the lifting member or the lifting member rests on a ground surface. The lifting member can hereby continue to be used repeatedly.

In a preferred embodiment the lift truck according to the present invention is characterized in that the lifting member comprises a body part distally of the sensor means, between the shell part and the base part, which is coupled functionally to the sensor means and the shell part and comprises the deformation zone. A further preferred embodiment of the lift truck according to the present invention has the feature that the body part comprises as deformation zone a weakened portion over at least substantially a full width which allows an at least partial displacement in the longitudinal direction of a portion of the body part coupled to the shell part distally of the weakened portion relative to a portion of the body part coupled functionally to the sensor means proximally of the weakened portion. Because the weakened portion extends in a width direction, transversely of the longitudinal direction, a rigidity of the body part in the width direction is not affected, or hardly so. In the case of such a deformation zone a deformation of the body part will thus take place almost solely in the longitudinal direction. The body part with deformation zone remains well able here to withstand transverse forces occurring for instance when the lifting member is placed in the width direction obliquely under or into a cargo for lifting, such as a pallet base, or in the unlikely event the lifting member strikes an obstacle on the side.

In a further preferred embodiment the lift truck according to the present invention is characterized in that the weakened portion comprises a recess in the body part which extends from a side of the body part directed toward the shell part in a height direction of the vertical load. The recess is for instance a groove or cut in the body part which provides freedom of movement for a displacement of a part of the body part distally of the groove in longitudinal direction. In a particular embodiment hereof the lift truck according to the present invention is characterized in that the weakened portion comprises adjacently of the recess a further recess in opposite direction in the body part which extends in height direction from a side of the body part directed toward the base part. The recesses define here a kind of crumple zone highly suitable for the purpose of largely or wholly absorbing moments of force, precisely in the longitudinal direction.

In a further preferred embodiment the lift truck according to the present invention is characterized in that the recess and the further recess extend beyond a centre line in the longitudinal direction of the body part. This results in a bridging part directed solely vertically, in height direction, between the recesses, with which part a distal part of the body part is connected distally of the recesses to a proximal part of the body part proximally of the recesses through which substantially only a vertically directed force can be carried so that the bridging part exerts a vertical force on the proximal part of the body part and the sensor means.

A particular embodiment of the lift truck according to the present invention is characterized in that the portion of the body part distally of the deformation zone is fixed with fixing means to the shell part. The fixing means hereby define the pressure point along which the forces on the shell part are carried to the body part.

In a further particular embodiment the lift truck according to the present invention is characterized in that the sensor means comprise a strain gauge which is provided in the force sensor and determines a mechanical deformation in the force sensor.

In a further preferred embodiment the lift truck according to the present invention is characterized in that the body part with the weakened portion is integral with the force sensor. The force sensor, for instance a load cell, can here comprise for instance in a part distally of the measuring part with the sensor means a recess as described above, for instance one or more grooves, which allows a deformation in the longitudinal direction. The force sensor can be coupled here with a part distally of the recess to the shell part in order to define the pressure point.

In an alternative particular embodiment the lift truck according to the present invention is characterized in that the body part is a part of a separate body which is coupled to the force sensor. The use of a separate body in which the deformation zone is present makes it unnecessary to modify the actual force sensor, for instance a conventional load cell. The invention can thus be applied with known force sensors. The force sensor can be coupled here with a distal outer end to the separate body, while the separate body is attachable to the shell part. An attachment between the separate body and the shell part, for instance a fixing means such as a fixing bolt, here defines the pressure point along which a load exerted on the shell part is transmitted to the force sensor.

The invention will now be further elucidated on the basis of a number of exemplary embodiments and an accompanying drawing. In the drawing:

FIGS. 1A,B show respectively a perspective and detail view of a first exemplary embodiment of a lifting member according to the invention for application in a lift truck according to the invention;

FIGS. 2A,B show respectively a side view and detail view of the first exemplary embodiment of a lifting member according to the invention;

FIGS. 5A,B show respectively a side view and detail view of the first exemplary embodiment of a lifting member according to the invention with shell part.

The figures are otherwise purely schematic and not drawn to scale. For the sake of clarity some dimensions in particular may be exaggerated to a greater or lesser extent. Corresponding parts are designated as far as possible in the figures with the same reference numeral.

Figure 1A:
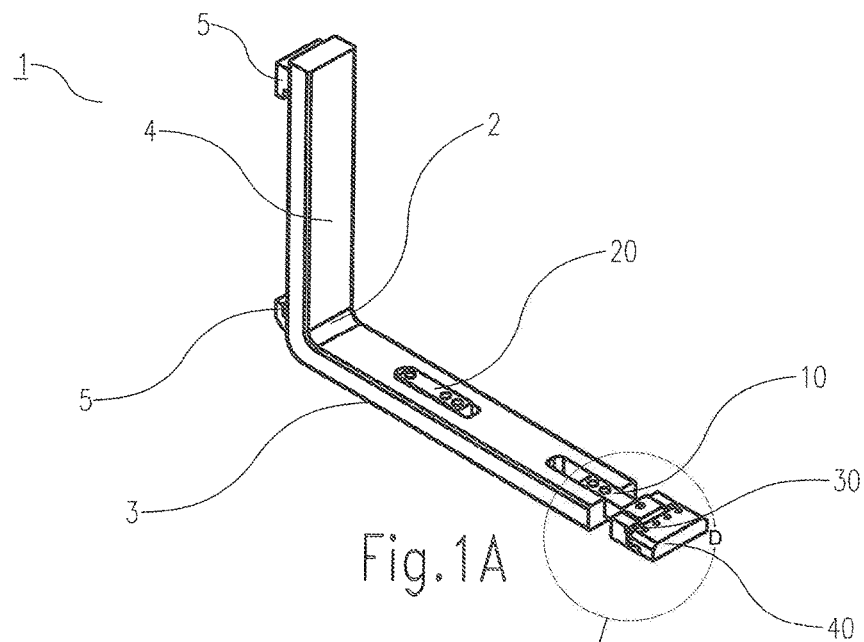
Figure 1B:
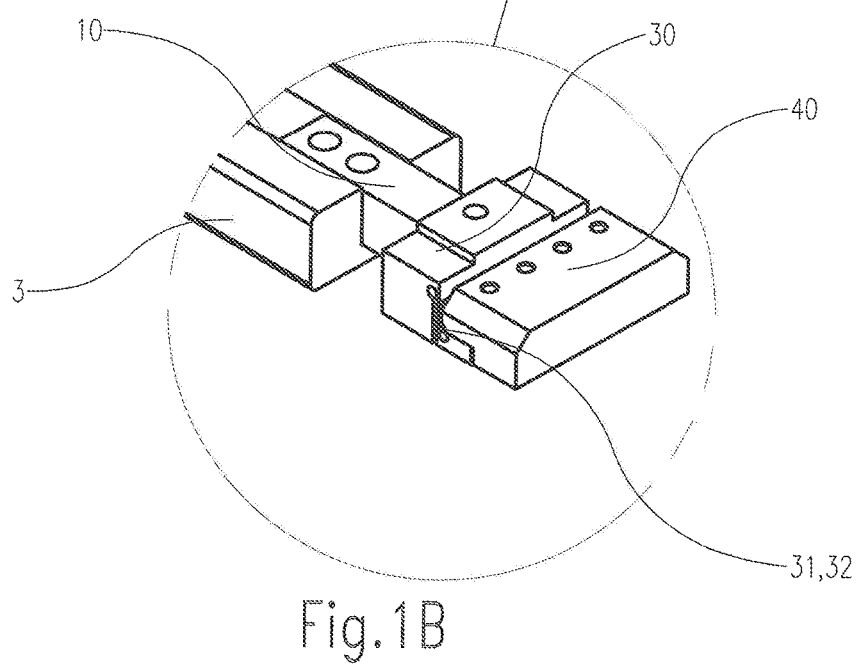

As shown in FIGS. 1A, 1B, 2A and 2B in a first exemplary embodiment of a lifting member according to the invention, lifting member 1 comprises a relatively solid base part 2 having in a lying part 3 two open spaces in which two load cells 10,20 are provided as force sensor. At a proximal outer end the lifting member comprises on an upright part 4 a set of fastening hooks 5 with which the lifting member can be attached to lifting means of a lift truck, such as to a lifting board of a fork-lift truck. Load cell 10 on a distal outer end of base part 2 is coupled with a proximal outer end to the base part and supports thereon, while a distal outer end of load cell 10 protrudes from the base part and is coupled to a separate body 30. Separate body 30 comprises a deformation zone in the form of a set of recesses, as shown in detail in FIGS. 4A-4C. The separate body is fixed to a shell part by means of fixing means, for instance a number of fixing bolts, and via a further body 40.

FIGS. 5A,B show the first exemplary embodiment of a lifting member according to the invention with arranged shell part 50. Shell part 50 of metal wholly covers base part 2 and the force sensors 10,20 provided therein, and thereby protects the relatively sensitive force sensors. On a lifting side shell part 50 has a flat, even surface to enable a cargo for lifting to be received thereon. Shell part 50 extends distally from base part 2 and forms a tip of the lifting member. Shell part 50 comprises in the tip a bent part which extends back to the outer end of base part 2 on an underside of the lifting member lying opposite the lifting side. Shell part 50 thus forms a so-called shoe body which is arranged round base part 2.

The further body 40 is attached to an underside of shell part 50 on the lifting side. The further body is a substantially block or beam-like metal body attached to the shell part by means of welding. Use can however also be made for this purpose of another type of attachment, such as for instance a screw connection. The further body 40 is provided with fixing means in the form of threaded holes for a connection to separate body 30 by means of complementary fixing means such as threaded bolts. Separate body 30 is hereby attached to shell part 50 via further body 40. Although in an alternative embodiment the separate body according to the invention can also be attached directly to the shell part, the intervening further body provides a suitable and simple attachment method wherein the integrity of the shell part itself need not be affected.

During lifting of a cargo with the lifting member, forces resulting from a weight of the cargo can cause bending of the lifting member, in particular close to the distal end of the lifting member. Because force sensors 10,20 are mounted here between shell part 50 and base part 2, this results in known lifting members in a play of forces and deformations in the force sensors which reduce the accuracy of the sensor means provided in the force sensors. The provision of separate body 30 with deformation zone prevents this however in that the part of the load cells with the sensor means is loaded almost solely in the correct vertical direction.

Figure 3:
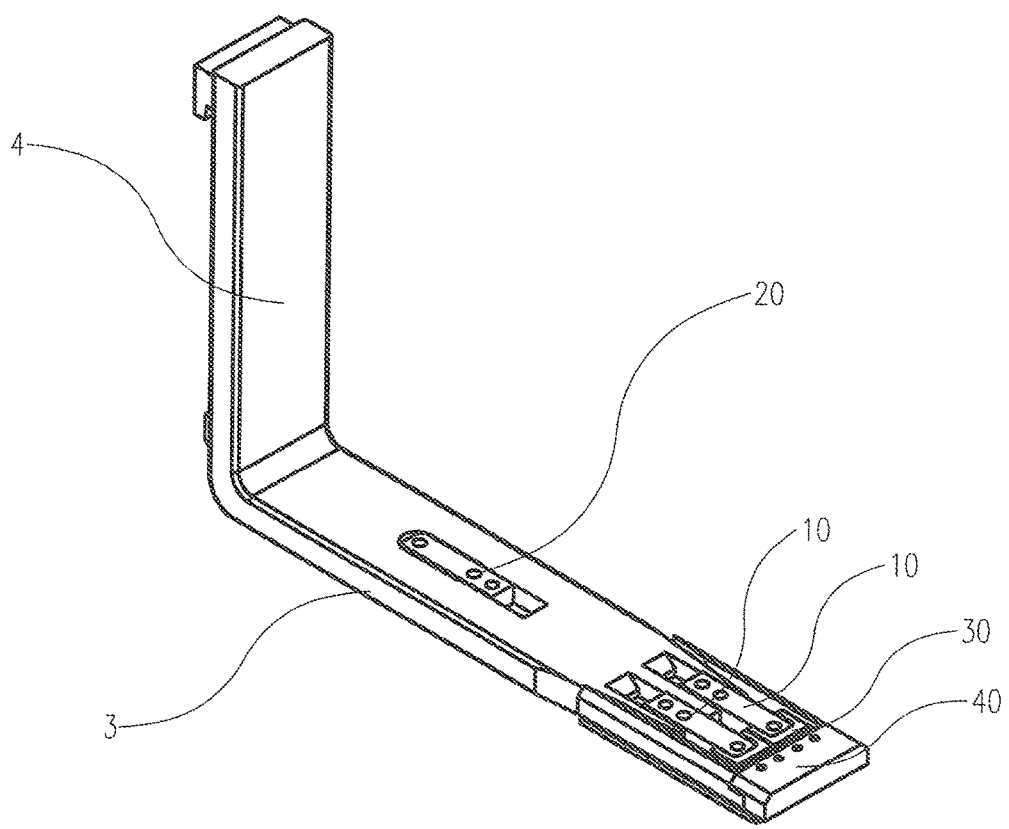
FIG. 3 shows a perspective view of a second exemplary embodiment of a lifting member according to the invention for application in a lift truck according to the invention.

As shown in FIG. 3 in a second exemplary embodiment of a lifting member according to the invention, a plurality of load cells, in this case a pair of load cells 10, is coupled to a body part 30 with deformation zone. Load cells 10 are placed parallel to each other here so as to be able to correct for possible moments of force in a width direction of the lifting member, transversely of the longitudinal direction. A weight measurement result of the lifting member is hereby exceptionally precise under substantially all conditions and a correct placing of the cargo for measuring is less critical for the eventual accuracy of the measurement.

Figure 4A:
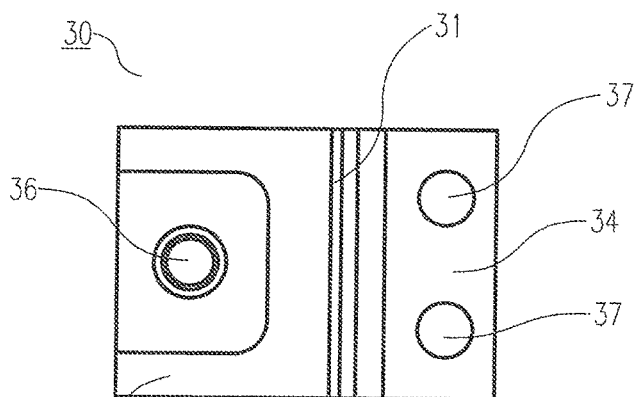
FIGS. 4A-4C show respectively a top, perspective and side view of a separate body with weakened portion applicable in a lifting member according to the invention.
Figure 4B:
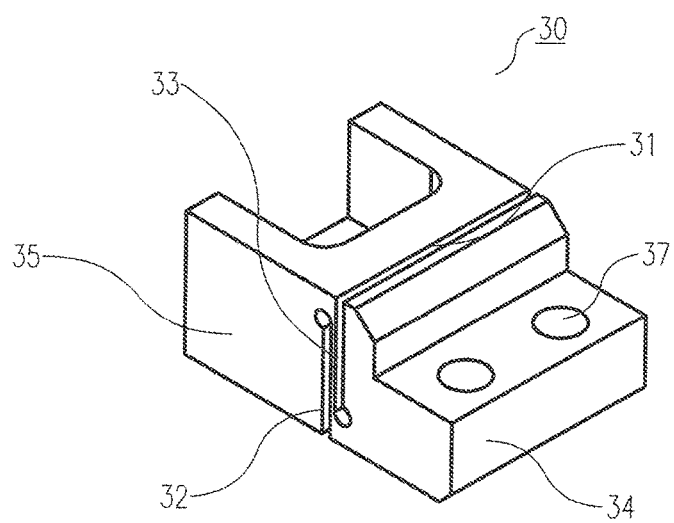
Figure 4C:
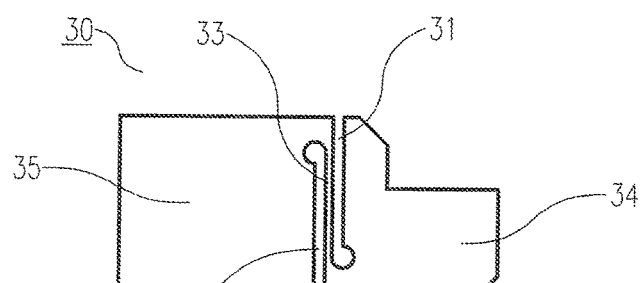

FIGS. 4A, 4B and 4C show in more detail a separate body 30 with deformation zone which is particularly suitable for application in a lifting member with force sensors for the purpose of thereby realizing an accurate measurement result. Separate body 30 comprises a deformation zone in the form of a set of grooves 31,32 which are parallel but run in opposite directions and which enable a displacement of a part of body 34 distally of the deformation zone relative to a part of body 35 proximally of the deformation zone in the longitudinal direction. The grooves extend here beyond a centre line in the longitudinal direction of the body so that a bridging part 33 between proximal part 35 and distal part 34 of the body forms only a vertical connection between parts 34,35. In the case of loads other than a purely vertical load on distal part 34, the deformation zone will deform from a rest state to a deformed state and here absorb the other than purely vertical force. Distal part 34 will here diverge relative to proximal part 35 on a side with groove 31 and be compressed relative to proximal part 35 on a side with groove 32. Because grooves 31,32 extend in body 30 in a width direction, transversely of the longitudinal direction of the lifting member, separate body 30 is relatively rigid in width direction. Body 30 is hereby well able to withstand lateral forces unexpectedly exerted on the lifting member, such as when the lifting member strikes an obstacle. Because of the grooves the separate body is nevertheless able and configured to deform in the longitudinal direction in order to prevent the occurrence of possible tensile and shear forces in the load cells. The separate body is manufactured from metal, for instance steel, and is therefore wear-resistant. Despite the usually great forces associated with the lifting of a cargo, for instance in the case of a fork-lift truck or pallet truck, the lifting member can thus be utilized in reliable manner for a long period of time to perform an accurate weight measurement of cargo.

Although the invention has been further elucidated with reference to only a few exemplary embodiments, it will be apparent that the invention is by no means limited thereto. On the contrary, many other variations and embodiments are possible within the scope of the invention for the person with ordinary skill in the art.

The invention claimed is:

1. Lift truck with a lifting device comprising at least one lifting member provided with lifting means for adjusting the lifting member in height direction, wherein the lifting member comprises a shell part lying over a base part and having a surface for receiving a cargo thereon, and wherein the shell part supports from a pressure point on the base part via an electronic force sensor, this force sensor being able and configured to determine a vertical load on the shell part and to generate an electronic signal as measure thereof, and comprising for this purpose pressure and/or strain-sensitive sensor means, wherein in a longitudinal direction of the lifting member directed transversely of the vertical load there is provided between the sensor means and the pressure point a mechanical deformation zone which is able and configured to deform in at least substantially wholly elastic manner, under the influence of a force effect exerted thereon in the longitudinal direction, from a rest state to a state deformed in the longitudinal direction, wherein the lifting member comprises a body part distally of the sensor means, between the shell part and the base part, which is coupled functionally to the sensor means and the shell part and comprises the deformation zone, and wherein the body part comprises as deformation zone a weakened portion over at least substantially a full width which allows an at least partial displacement in the longitudinal direction of a portion of the body part coupled to the shell part distally of the weakened portion relative to a portion of the body part coupled to the sensor means proximally of the weakened portion.

2. Lift truck as claimed in claim 1, wherein the weakened portion comprises a recess in the body part which extends from a side of the body part directed toward the shell part in a height direction of the vertical load.

3. Lift truck as claimed in claim 2, wherein the weakened portion comprises adjacently of the recess a further recess in opposite direction in the body part which extends in height direction from a side of the body part directed toward the base part.

4. Lift truck as claimed in claim 3, wherein the recess and the further recess extend beyond a centre line in the longitudinal direction of the body part.

5. Lift truck as claimed in claim 1, wherein the portion of the body part distally of the deformation zone is fixed with fixing means to the shell part.

6. Lift truck as claimed in claim 1, wherein the sensor means comprise a strain gauge which is provided in the force sensor and determines a mechanical deformation in the force sensor.

7. Lift truck as claimed in claim 1, wherein the body part is a part of a separate body which is coupled to the force sensor.

8. Lift truck as claimed in claim 1, wherein the body part with the weakened portion is integral with the force sensor.

9. Lifting member as applied in a lift truck as claimed in claim 1.

10. Lifting member as claimed in claim 9, comprising a lift fork.

11. Lifting member as claimed in claim 9, comprising a tine.

* * * * *